United States Patent

Nash

[15] 3,687,374
[45] Aug. 29, 1972

[54] SWIVELABLE JET NOZZLE

[72] Inventor: Dudley O. Nash, Cincinnati, Ohio
[73] Assignee: General Electric Company
[22] Filed: July 2, 1970
[21] Appl. No.: 51,779

[52] U.S. Cl............................239/265.35, 60/232
[51] Int. Cl..............................................B64c 15/04
[58] Field of Search.................239/265.11–265.43; 244/12 D, 23 D; 60/232

[56] References Cited

UNITED STATES PATENTS

| | | | |
|---|---|---|---|
| 3,443,758 | 5/1969 | Kopp et al. | 60/232 X |
| 2,883,880 | 4/1959 | Merkle | 74/421 R X |
| 2,950,628 | 8/1960 | Bade | 74/421 R |
| 3,525,475 | 8/1970 | Schweikl | 239/265.35 |
| 3,260,049 | 7/1966 | Johnson | 239/265.35 |
| 3,418,809 | 12/1968 | Kopp | 239/265.35 X |
| 3,429,509 | 2/1969 | Markowski | 239/265.35 X |
| 3,450,348 | 6/1969 | Kopp | 239/265.35 X |

Primary Examiner—M. Henson Wood, Jr.
Assistant Examiner—Thomas C. Culp, Jr.
Attorney—Derek P. Lawrence, Erwin F. Berrier, Jr., Lee H. Sachs, Frank L. Neuhauser, Oscar B. Waddell and Joseph B. Forman

[57] ABSTRACT

A uniplanar swivelable jet exhaust nozzle having duct sections which are serially and rotatably connected in planes oblique to their longitudinal axes. The first duct section is rotatably connected to support structure and peripherally carries a speed reduction train. The first gear of the train engages a motor driven ring gear extending around and carried by the first duct, and the last gear of the train engages a ring gear carried by the second duct section to impart torque thereto. A first gear of a synchronizing gear train, peripherally carried by the first duct, engages the second duct ring gear and a last gear of that train engages a ring gear fixedly carried by the support structure. Suitable connecting means are provided to drive the remaining duct sections.

6 Claims, 4 Drawing Figures

Patented Aug. 29, 1972

INVENTOR.
DUDLEY O. NASH

ATTORNEY

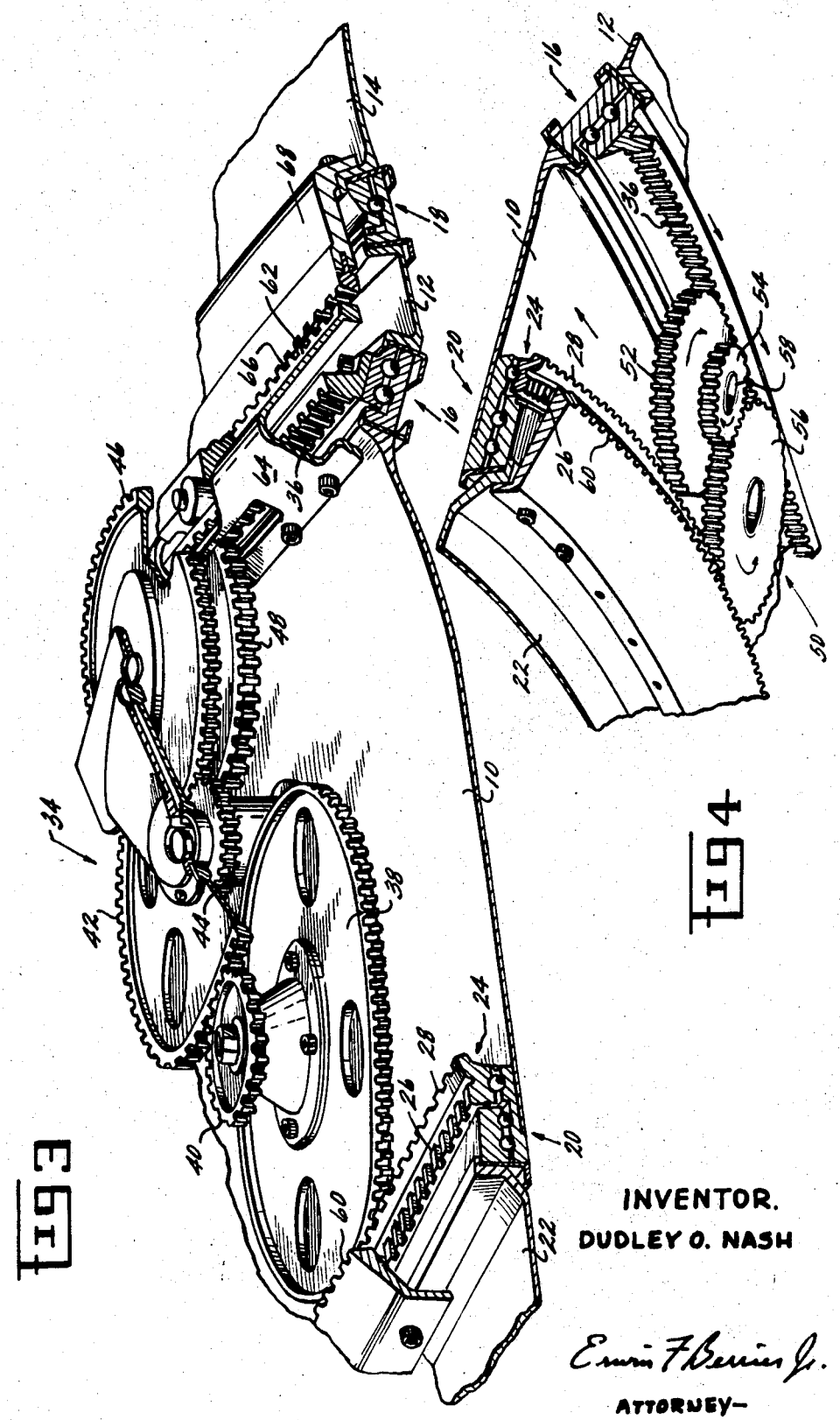

SWIVELABLE JET NOZZLE

This invention relates to a jet nozzle which is swivelable in a single plane and, more particularly, to a new and improved system for rotatably driving the duct sections forming such nozzle.

Swivelable jet nozzles of the general type to which the present invention relates have heretofore been proposed for aircraft use to provide vertical and/or short take-off and landing capabilities. In such applications it is important that the longitudinal axes of all duct sections comprising the nozzle remain, at all times, coplanar so as to prevent undesirable side thrust and aircraft yaw. In addition, it is highly desirable in aircraft applications that the jet nozzle be of minimum weight and envelope.

A primary object of this invention is, therefore, a uniplanar swivelable jet nozzle which has a reduced envelope and is of light weight construction.

Another object of this invention is a drive system for a swivelable jet nozzle wherein torque is transmitted from drive means disposed remotely of the jet nozzle, to a downstream nozzle duct section and, thence, to the remaining nozzle duct sections.

Other objects and advantages of the present invention will become apparent upon reading hereinafter.

Briefly stated, the swivelable nozzle of this invention includes a plurality of serially connected duct sections adapted to receive and exhaust a pressurized fluid. The first or upstream duct section is rotatably connected, in a plane normal to its longitudinal axis, to suitable supporting structure such as an aircraft or jet engine. The remaining duct sections are serially connected for rotation about axis oblique to their longitudinal axes and so that equal and opposite rotation of alternate duct sections, including the first duct section, swivels the nozzle in such a way that the longitudinal axes of all duct sections remain in a single plane.

A drive ring, having a first ring gear in driving engagement with suitable motor drive means, is rotatably carried by the first duct section or the supporting structure and includes a second ring gear engaged with speed reducer power transmitting gear means carried by the first duct section. The speed reducer means, in turn, engages a ring gear carried by the second or immediately adjacent downstream duct section. Synchronizing gear means carried by the first duct section engage the second duct section ring gear and a ring gear fixedly carried by the supporting structure, whereby rotation of said drive ring gear effects equal and opposite rotation of the first and second duct sections. Rotation of subsequent duct sections may be achieved by a gear or other connection between such subsequent duct section and an upstream duct section.

While the specification concludes with claims particularly pointing out and distinctly claiming the subject matter of this invention, it is believed that the invention will be better understood upon reading the following description of the preferred embodiment in connection with the accompanying drawings, wherein:

FIG. 3 is an enlarged perspective view of the gear system denoted generally at 34 in FIG. 2; and FIG. 4 is an enlarged perspective view of the gear system denoted generally at 50 in FIG. 2.

Figure 1:
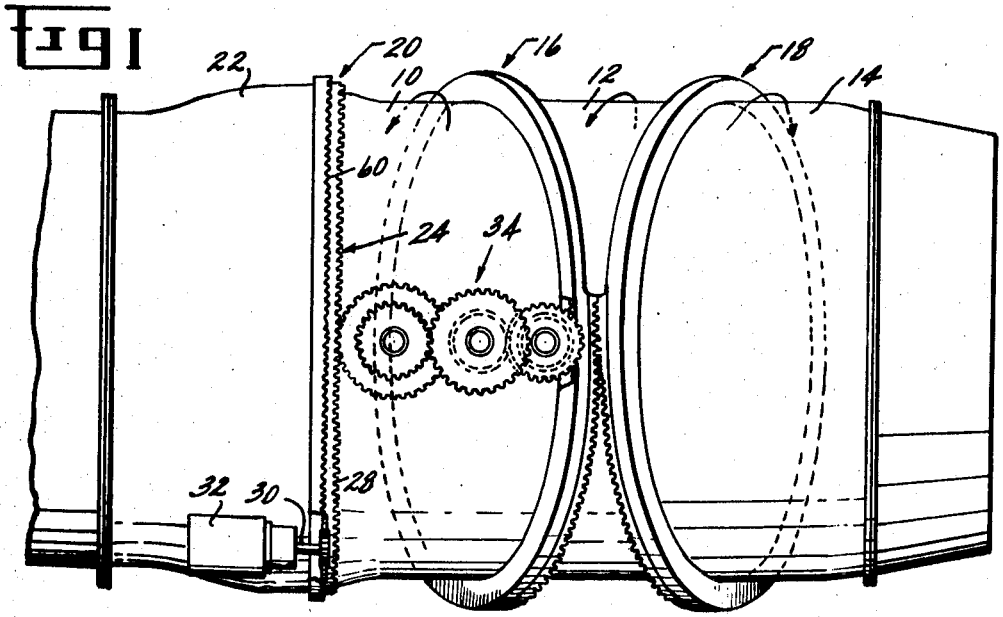
FIG. 1 is a side elevational view of the swivelable jet nozzle of the present invention secured to a jet engine and disposed in its horizontal thrust position.

With reference now to FIG. 1, a swivelable jet nozzle has been shown as comprising a first duct section 10, a second duct section 12 and a third duct section 14. Duct sections 10 and 12 are rotatably connected in a plane oblique to their respective longitudinal axes through bearing means 16, while duct sections 12 and 14 are rotatably connected in a plane oblique to their respective longitudinal axes through bearing means 18. The first or upstream duct section 10 is rotatably connected, in a plane normal to its longitudinal axis and through bearing means 20, to suitable support structure 22, such as an aircraft or jet engine, for receipt of a pressurized fluid.

Figure 2:
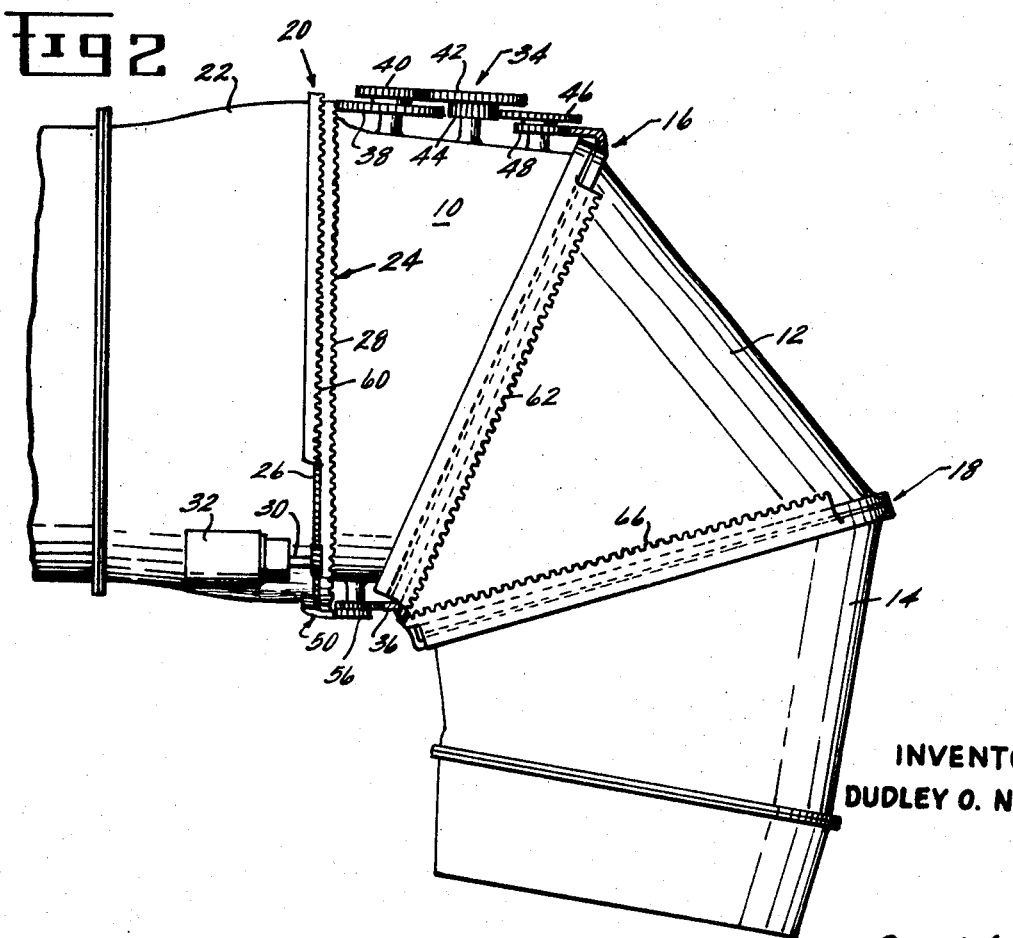
FIG. 2 is a side elevational view of the jet nozzle of FIG. 1 swiveled to a vertical thrust position.

Each duct section is, for practical reasons, generally elliptical in cross-section, with the major and minor axes of the ellipse of duct section 10 residing in the plane of FIG. 1 and the plane of FIG. 2, respectively. The ends of the duct sections residing in the plane of rotation of bearing means 16, 18, or 20 are of circular cross-section to accommodate such bearing means.

Referring now to FIG. 2 and 3, a drive ring 24, formed with a first ring gear 26 and a second ring gear 28, extends around and is suitably journaled for rotation to the first duct section 10, and is connected through ring gear 26 and the shaft of pinion gear 30 to a suitable motor drive means 32.

Speed reducer and power transmitting means 34, carried by duct section 10, is provided for transmitting torque from drive ring 24 to a second duct section ring gear 36 and has been shown as comprising a gear 38, which engages the ring gear 28 of the drive ring 24, engaged gears 40 and 42, engaged gears 44 and 46, and gear 48 which engages the second duct ring gear 36. While the number and arrangement of gears used in the train comprising speed reducer means 34 may be varied, in the embodiment FIG. 1 it is preferred that the speed reduction between drive ring 24 and ring gear 36 be approximately 28 to 1 so that the torque may be transmitted at high speed and low force to minimize the size and weight of such gears. In addition, the rotational axis of each gear comprising means 34 is preferably disposed in the plane of the minor axis of the duct section ellipse so as to minimize the spatial envelope of the jet nozzle.

Turning now to FIG. 2 and 4, means for rotatably driving duct section 10 at the same speed as duct section 12, but in opposite direction, has been shown generally at 50 as comprising a lightly loaded synchronizing gear train mounted upon duct section 10 which includes gears 52, 54, and 56. Gear 52, the first gear of the train, engages ring gear 36 of duct section 12 and drives gear 54 through its pivot shaft 58. Gear 56 engages a ring gear 60, which is fixedly carried by supporting structure 22, and is rotatably driven through engagement with gear 54.

As previously discussed in connection with gear means 34, the pivot axes of gears 52, 54, and 56 preferably reside in the plane of minor axis of the duct section ellipse so as to minimize the spatial envelope of the jet nozzle.

With reference again to FIG. 3, in order to rotate the third duct section 14 in the same direction and at the same speed as duct section 10 so as to achieve swiveling of the jet nozzle in a single plane, a ring gear segment 62 is mounted to duct 10 by means of a bracket 64 for engagement at the narrow side of duct 12 with a like ring gear segment 66 which is mounted to duct 14 by means of a bracket 68.

In operation, when the direction of fluid efflux and thrust is to be varied from, for example, the horizontal thrust mode of FIG. 1 to the vertical thrust mode of FIG. 2, drive ring 24 is driven counter-clockwise, as viewed in FIG. 3, by motor means 32. Drive ring 24, in turn, drives speed reducer means 34, through engagement of its ring gear 28 with gear 38. Clockwise torque is applied to the second duct section 12 through engagement of the speed reducer means gear 48 with the second duct section ring gear 36.

Synchronized rotation of duct section 10, in a direction opposite to that of duct section 12, is effected by the lightly loaded gear train 52, 54, 56, which comprises synchronizing gear means 50.

Duct section 14 is rotated in the same direction and at the same speed as duct section 10 by providing suitable connecting means therebetween, such as ring gears 62 and 66. As will be appreciated, by rotating the alternating duct sections at the same speed, but in opposite directions, ducts 12 and 14 swivel in such a manner that the longitudinal axes of all duct sections remain in a single plane and undesirable side thrusts are avoided.

While the swivelable jet nozzle of this invention has been shown as comprising three duct sections, it will be understood that the number may be varied depending upon the desired degree of swivel. For example, in applications requiring some degree of reverse thrust, a fourth duct section might be added to the series and rotatably driven by the second duct section through a suitable connecting means.

Since the swivelable jet nozzle of this invention transmits torque from the supporting structure mounted motor drive means 32 at high speed and low force and facilitates the placement of gear reducer means 34 and synchronizing gear means 50 along the plane of the minor elliptical axis of duct section 10, significant reductions in overall spatial envelope and weight are achieved.

While a single embodiment has been depicted and described, it will be appreciated that many modifications, additions and changes may be made thereto without departing from the fundamental theme of the invention.

What is claimed is:

1. In a swivelable jet nozzle of the type having a plurality of duct sections serially and rotatably connected in planes oblique to their longitudinal axes, with the first said duct section rotatably connected to supporting structure in a plane normal to its longitudinal axis, improved means for rotatably driving the first and second duct sections of such series from motor drive means carried by said supporting structure, comprising:
   a rotatable drive ring operably connected to said drive means, extending around said first duct, and including a first ring gear,
   speed reducer and power transmitting gear means carried by said first duct section for transmitting torque to said second duct section, and having a first gear engaged with said first ring gear,
   a second ring gear fixedly carried by said second duct section and engaged with a last gear of said speed reducer and power transmitting gear means,
   a third ring gear fixedly carried by said supporting structure, and
   synchronizing gear means carried by said first duct section and including a first gear engaging said second ring gear and a last gear engaging said third ring gear for synchronizing the rotation of said first and second duct sections in opposite directions in response to said transmitted torque.

2. The improved jet nozzle of claim 1 further characterized in that said duct sections are generally elliptical in cross-section, with said speed reducer and power transmitting gear means and said synchronizing gear means disposed on the periphery of said first duct section and generally in the plane of the minor elliptical axis thereof.

3. The improved jet nozzle of claim 1 further characterized in that said speed reducer and power transmitting gear means and said synchronizing gear means respectively comprise gear trains sized to cooperatively produce approximately a 28 to 1 reduction between the speed of said first ring gear and the speed of said second gear.

4. The improved jet nozzle of claim 1 further characterized in that said drive ring is journaled for rotation to said first duct section.

5. The improved jet nozzle of claim 1 further characterized in that said jet nozzle comprises three duct sections and means for operably connecting said first and third duct sections for rotation in the same direction and at the same speed.

6. The improved jet nozzle of claim 5 further characterized in that said connecting means comprise a pair of engaged ring gears.

* * * * *